US012158097B2

(12) United States Patent
Bartlett et al.

(10) Patent No.: US 12,158,097 B2
(45) Date of Patent: Dec. 3, 2024

(54) THERMAL ACCUMULATOR ASSEMBLY

(71) Applicant: FCA US LLC, Auburn Hills, MI (US)

(72) Inventors: Matthew T Bartlett, Northville, MI (US); Michael Wiland, Washington, MI (US); Tim Scott, Charlottesville, VA (US)

(73) Assignee: FCA US LLC, Auburn Hills, MI (US)

( * ) Notice: Subject to any disclaimer, the term of this patent is extended or adjusted under 35 U.S.C. 154(b) by 82 days.

(21) Appl. No.: 18/192,822

(22) Filed: Mar. 30, 2023

(65) Prior Publication Data

US 2024/0328341 A1 Oct. 3, 2024

(51) Int. Cl.

*F01N 5/02* (2006.01)
*F01N 11/00* (2006.01)
*F02G 5/02* (2006.01)

(52) U.S. Cl.

CPC ................ *F01N 5/02* (2013.01); *F01N 11/00* (2013.01); *F02G 5/02* (2013.01)

(58) Field of Classification Search

CPC ... F01N 5/02; F01N 11/00; F02G 5/02; F02G 5/04; F02G 5/00; F02G 2260/00; F02G 2254/15; Y02T 10/12; Y02T 10/40; Y02A 30/274; F28D 21/0001; F28D 21/0003; F28D 2021/008; F28D 2021/0064

See application file for complete search history.

(56) References Cited

U.S. PATENT DOCUMENTS 4,174,009 A * 11/1979 Laing ........................ F01K 3/00 165/104.31
4,354,807 A 10/1982 Shank et al.
4,526,005 A * 7/1985 Laing ........................ F25C 1/00 376/322
4,717,494 A * 1/1988 Itatani .................... C09K 5/063 560/197
6,589,033 B1 7/2003 Johnson et al.
6,866,092 B1 * 3/2005 Molivadas ................ F01L 3/12 165/47
8,216,736 B2 7/2012 Kwon
8,288,048 B2 10/2012 Thompson
9,435,230 B2 9/2016 Kim et al.
(Continued)

FOREIGN PATENT DOCUMENTS

CN 108365235 B 12/2020
EP 1700734 A1 9/2006

*Primary Examiner* — Dapinder Singh
(74) *Attorney, Agent, or Firm* — Jeremy J. Klobucar

(57) ABSTRACT

A thermal accumulator assembly (TAA) for a vehicle waste heat recovery system (WHRS) utilizing a two-phase coolant includes a hermetically sealed housing having a separator plate dividing an interior of the housing into a higher pressure first chamber and a lower pressure second chamber. A pressure control valve is disposed between the first and second chambers. A first inlet port is connected to the first chamber and configured to receive a first flow of coolant. A first outlet port is connected to the first chamber and configured to a second flow of liquid coolant to a heat generating component in the WHRS. A second inlet port is connected to the first chamber and configured to receive a third flow of heated coolant from the heat generating component. A second outlet port is connected to the second chamber and configured to supply a fourth flow of vapor coolant to the WHRS.

18 Claims, 5 Drawing Sheets

(56) References Cited

U.S. PATENT DOCUMENTS

| | | | | |
|---|---|---|---|---|
| 9,540,943 | B2 * | 1/2017 | Rutten | F01K 27/005 |
| 10,020,436 | B1 * | 7/2018 | Gravina | H05K 7/1492 |
| 10,147,989 | B2 | 12/2018 | Shina et al. | |
| 10,323,546 | B2 * | 6/2019 | Kollmeier | F02B 41/00 |
| 10,516,194 | B2 | 12/2019 | Zhou et al. | |
| 10,989,102 | B2 * | 4/2021 | Han | F01P 11/028 |
| 11,187,113 | B2 * | 11/2021 | Bolles | F01K 5/02 |
| 11,927,203 | B2 * | 3/2024 | Abaitancei | F16H 61/4096 |
| 2010/0285381 | A1 | 11/2010 | Biederman et al. | |
| 2011/0030548 | A1 * | 2/2011 | Berkun | F01L 23/00<br>91/358 R |
| 2012/0122004 | A1 | 5/2012 | Jeon et al. | |
| 2016/0161162 | A1 * | 6/2016 | Saito | F25B 47/022<br>62/277 |
| 2018/0183299 | A1 | 6/2018 | Stevens | |
| 2020/0355169 | A1 * | 11/2020 | Arnoux | F03G 7/04 |

* cited by examiner

THERMAL ACCUMULATOR ASSEMBLY

FIELD

The present application relates generally to waste heat recovery systems and, more particularly, to thermal accumulator assemblies for vehicle waste heat recovery.

BACKGROUND

Internal combustion engines and fuel cell stacks produce waste heat, which must be removed to protect temperature sensitive materials. Historical waste heat removal solutions typically released waste thermal energy to the ambient environment through heat exchangers such as a radiator located at a front of the vehicle. More efficient solutions include waste heat recovery systems (WHRS), which convert a portion of the waste thermal energy into useful energy for further use. However, such WHRS have typically not been integrated into automobiles as the systems are considered too complex and costly for the minimal amount of energy recovered. Accordingly, while such systems work well for their intended purpose, there remains a desire for improvement in the relevant art.

SUMMARY

In accordance with an example aspect of the invention, a thermal accumulator assembly (TAA) for a vehicle waste heat recovery system (WHRS) utilizing a two-phase coolant is provided. In one example implementation, the TAA includes a hermetically sealed housing having a separator plate dividing an interior of the housing into a higher pressure first chamber and a lower pressure second chamber. A pressure control valve is disposed between the first and second chambers and configured to regulate pressure in the second chamber by regulating an amount of vapor coolant passing from the first chamber to the second chamber. A first inlet port is connected to the first chamber and configured to receive a first flow of coolant from the WHRS. A first outlet port is connected to the first chamber and configured to receive a second flow of liquid coolant from the first chamber and provide the second flow to a heat generating component in the WHRS. A second inlet port is connected to the first chamber and configured to receive a third flow of heated coolant from the heat generating component. A second outlet port is connected to the second chamber and configured to supply a fourth flow of vapor coolant to the WHRS.

In addition to the foregoing, the described TAA may include one or more of the following features: at least one sensor disposed between the first and second chambers and configured to measure a pressure differential between the first and second chambers; a circulation pump disposed in the first chamber and configured to provide the second flow of liquid coolant to the first outlet port; wherein the pressure control valve is a continuous variable pressure control valve; wherein the continuous variable pressure control valve is in signal communication with a controller; wherein the continuous variable pressure control valve includes a solenoid; and wherein the pressure control valve is a fixed variable pressure control valve configured to open at a predetermined pressure.

In accordance with another example aspect of the invention, a vehicle is provided. The vehicle includes a heat generating component, and a waste heat recovery system (WHRS) fluidly coupled to the heat generating component and comprising a two-phase coolant for cooling the heat generating component. A thermal accumulator assembly (TAA) is fluidly coupled to the WHRS and includes a hermetically sealed housing having a separator plate dividing an interior of the housing into a higher pressure first chamber and a lower pressure second chamber. A pressure control valve is disposed between the first and second chambers and configured to regulate pressure in the second chamber by regulating an amount of vapor coolant passing from the first chamber to the second chamber. A first inlet port is connected to the first chamber and configured to receive a first flow of coolant from the WHRS. A first outlet port is connected to the first chamber and configured to receive a second flow of liquid coolant from the first chamber and provide the second flow to the heat generating component. A second inlet port is connected to the first chamber and configured to receive a third flow of heated coolant from the heat generating component. A second outlet port is connected to the second chamber and configured to supply a fourth flow of vapor coolant to the WHRS.

In addition to the foregoing, the described vehicle may include one or more of the following features: wherein the vehicle includes a second component fluidly coupled to the WHRS; wherein the second outlet port is configured to supply the fourth flow of vapor coolant to the second component; wherein the first inlet is configured to receive the first flow of coolant from the second component; wherein the second component is a heat pump condenser; and wherein the heat generating component is at least one of high voltage batteries or electronics.

In addition to the foregoing, the described vehicle may include one or more of the following features: wherein the TAA further includes at least one sensor disposed between the first and second chambers and configured to measure a pressure differential between the first and second chambers; wherein the TAA further includes a circulation pump disposed in the first chamber and configured to provide the second flow of liquid coolant to the first outlet port; wherein the pressure control valve is a continuous variable pressure control valve; wherein the continuous variable pressure control valve is in signal communication with a controller; and wherein the pressure control valve is a fixed variable pressure control valve configured to open at a predetermined pressure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for a thermal accumulator assembly for vehicle waste heat recovery. It will be appreciated, however, that the thermal accumulator assembly is not limited to vehicles and may be utilized with various other systems and components. The thermal accumulator assemblies described herein integrate main components of a waste heat recovery system (WHRS) into the internal volume of an accumulator. In this way, the thermal accumulator assembly integrates thermal and control hardware into a single assembly, thereby eliminating the need for separate and discrete components connected together with tubes, hoses, and sealed joints.

This configuration advantageously expands component design boundaries since internal components are no longer required to be protected from environmental exposure and burst pressure safety factors, which can now be satisfied by the shell of the accumulator. With discrete components connected by tubes or bolted joints, conventional heat exchangers are often required to have a generous safety factor for burst pressure. However, in the present design with heat exchangers located in the accumulator shell, heat exchanger cost can be reduced as they now need only withstand working pressure as opposed to burst pressure.

Additionally, discrete electric components (e.g., motors) are often exposed to the elements and include protective covers to ensure life. However, in the present design with electric components located in the accumulator shell, such requirements are eliminated and component parts can be left uncovered, thereby further reducing cost. Moreover, obviating the discrete components simplifies the vehicle assembly process by enabling a significant number of interconnection joint processes to take place in the component assembly process where fixturing, equipment, and processes are available that are not possible to create in a vehicle assembly process.

As such, the systems described herein advantageously result in: (i) increased vehicle packaging space as external connecting tubes and hoses between discrete components are eliminated and all of the fluid conduits are contained within the accumulator volume; (ii) easier assembly in the vehicle since all the interconnections except the coolant or the condenser are assembled outside of the vehicle assembly process; (iii) reduced working fluid charge because the internal volume is smaller compared with discrete components and external tube/hose conduits; (iv) elimination of protective environmental covers for electronic devices installed inside the accumulator; and (v) heat exchangers only needing to be designed for working pressure instead of burst pressure, creating an opportunity to use thinner heat exchanger plates to reduce cost.

Figure 1:
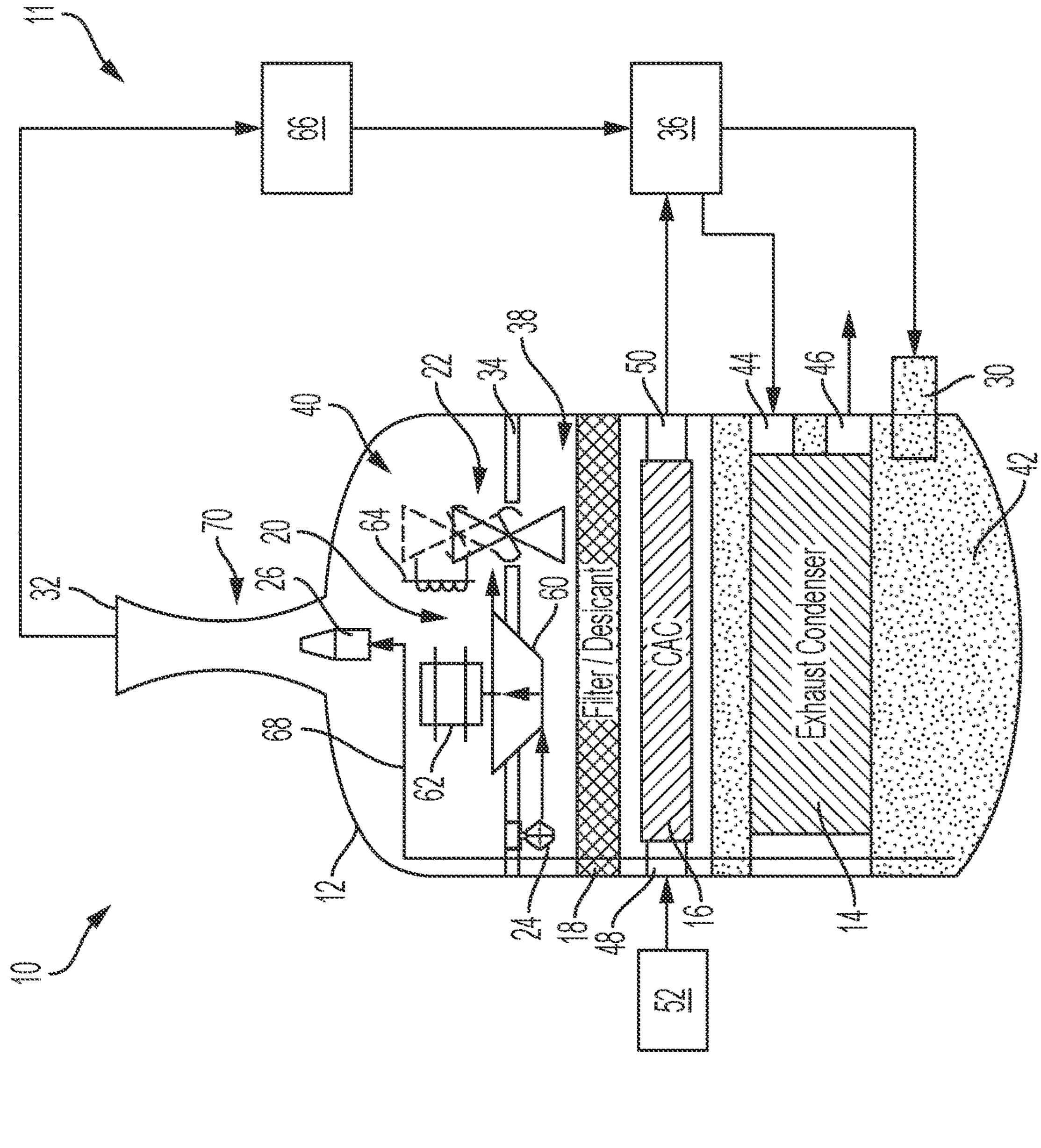
FIG. 1 is a schematic illustration of an example thermal accumulator assembly (TAA) for a waste heat recovery system (WHRS), in accordance with the principles of the present application.
Figure 2:
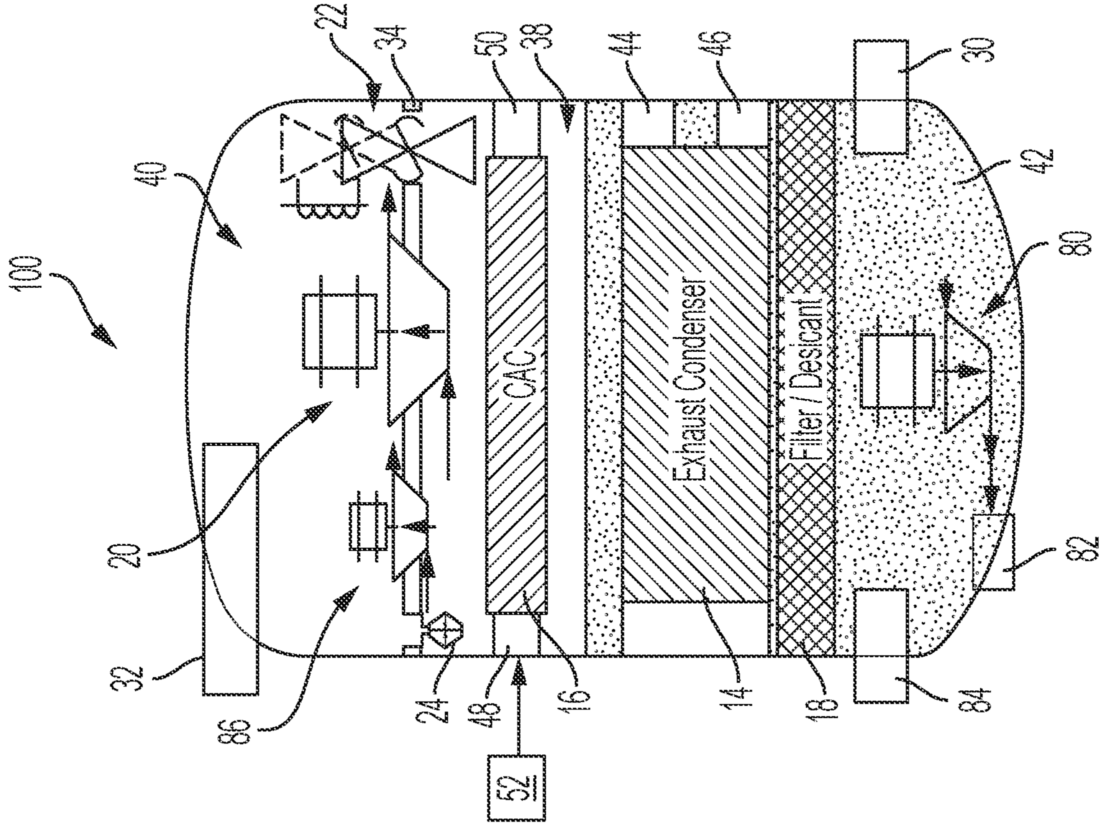
FIG. 2 is a schematic illustration of another example TAA for a WHRS, in accordance with the principles of the present application.
Figure 3:
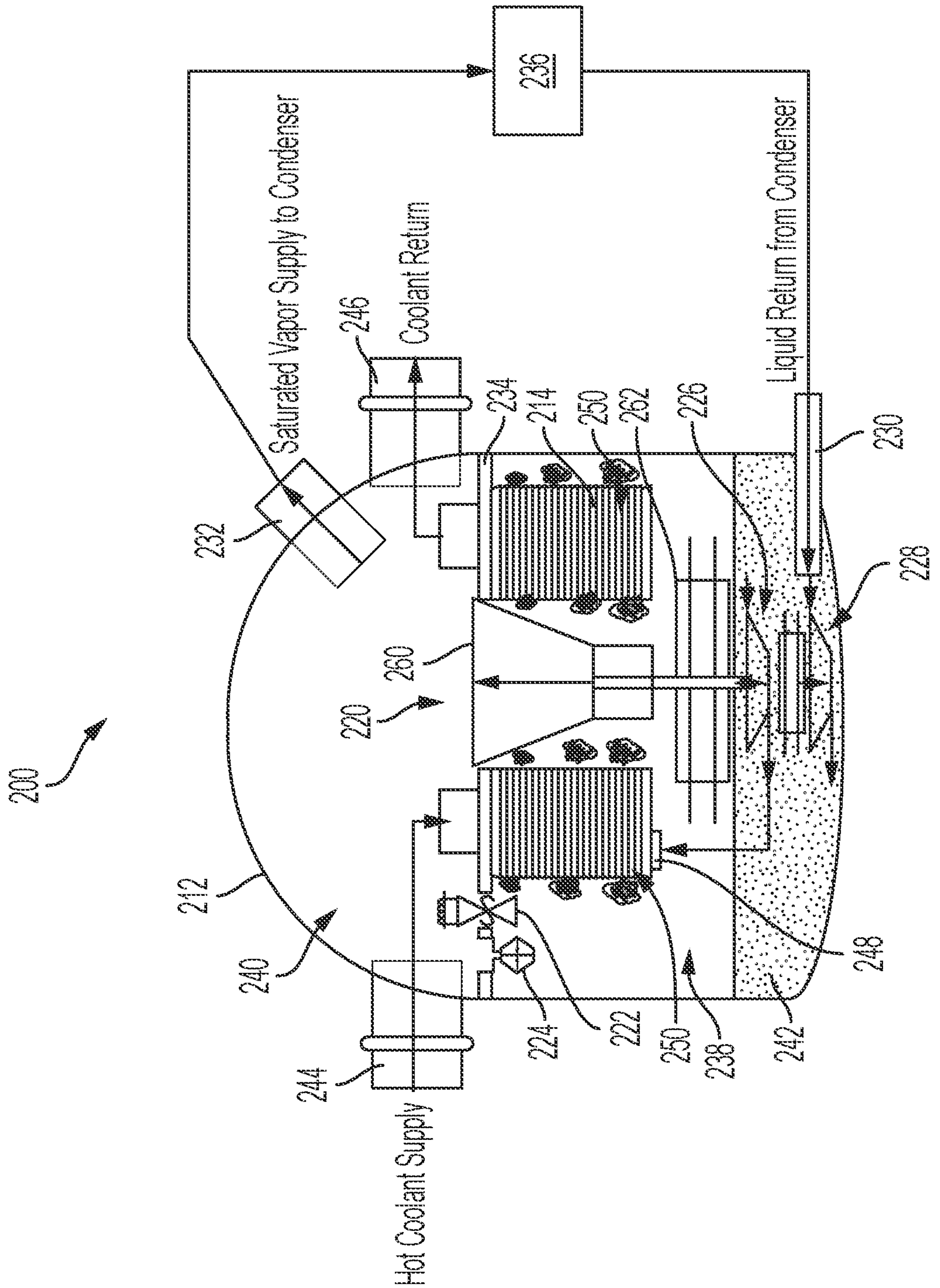
FIG. 3 is a schematic illustration of yet another example TAA for a WHRS, in accordance with the principles of the present application.
Figure 4:
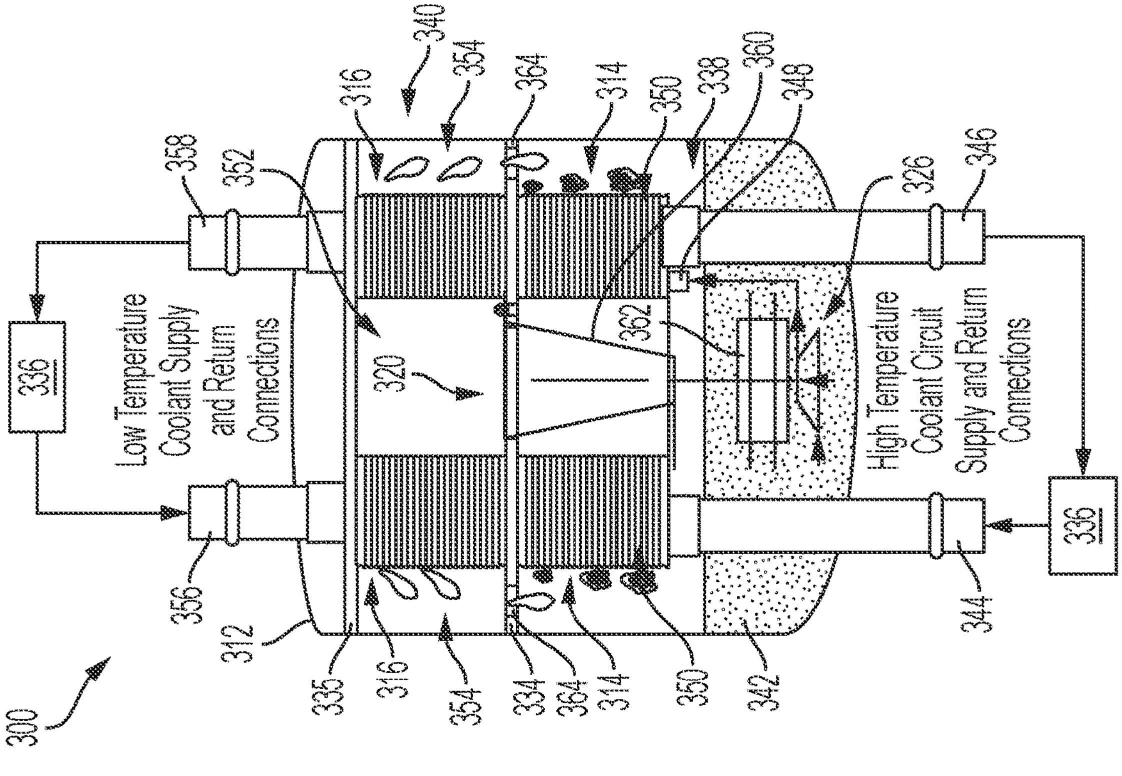
FIG. 4 is a schematic illustration of yet another example TAA for a WHRS, in accordance with the principles of the present application.
Figure 5:
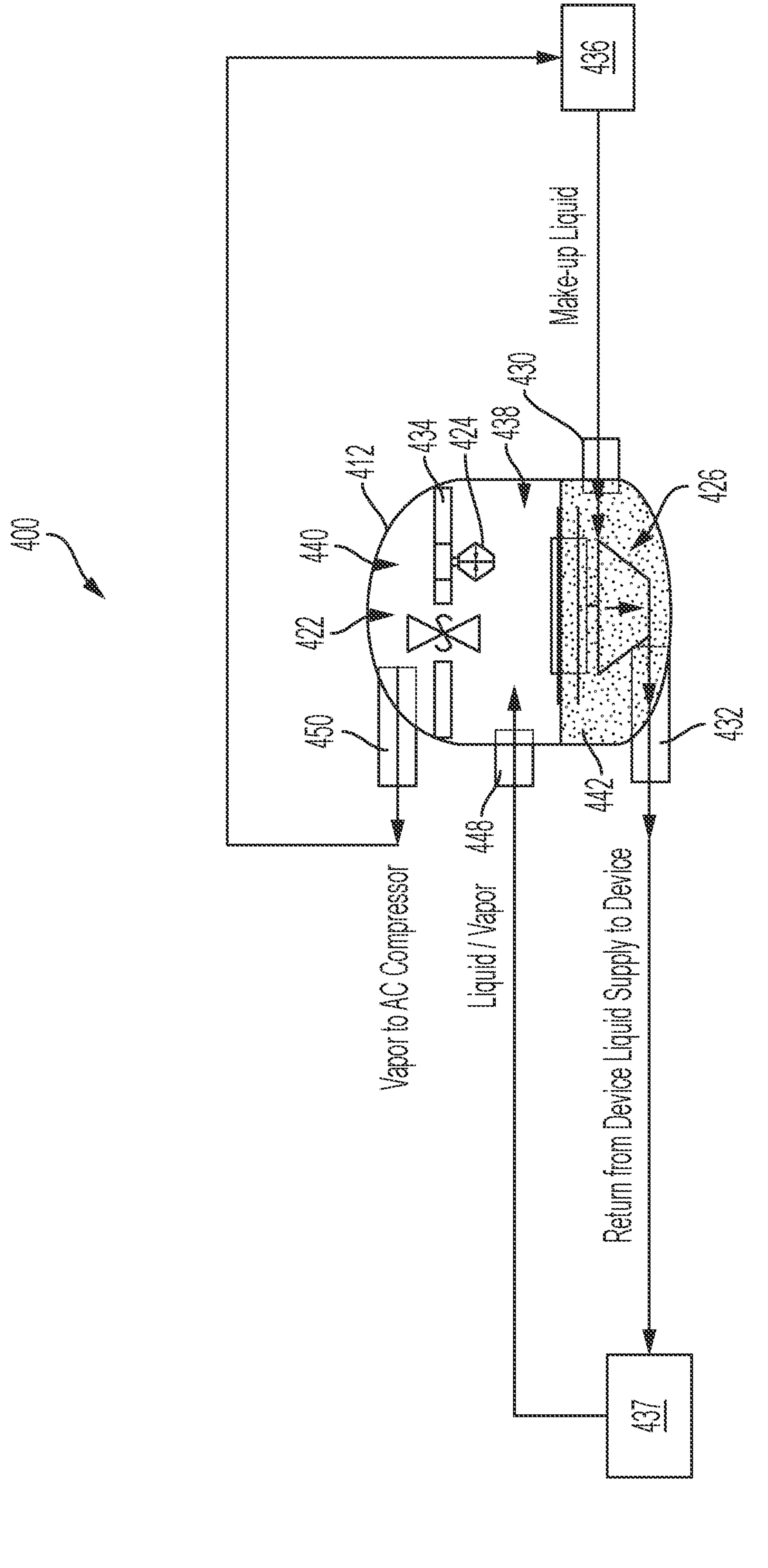
FIG. 5 is a schematic illustration of yet another example TAA for a WHRS, in accordance with the principles of the present application, in accordance with the principles of the present application.

With general reference to FIGS. 1-5, thermal accumulator assemblies (TAA's) are illustrated in accordance with the principles of the present disclosure. The TAA's may be utilized in waste heat recovery systems (WHRS) such as, for example, an Organic Rankine Cycle (ORC) in a vehicle WHRS to exploit a temperature difference between a power plant (e.g., engine, e-motor) and the environment. For example, a portion of the waste thermal energy is converted to offset power consumption in other vehicle components (e.g., pumps, fans, etc.), for example, to contribute to higher propulsion system efficiency, decrease parasitic losses and fuel consumption, or increase driving range. FIG. 1 illustrates an example direct-type ORC TAA 10 with a compressed air cooler, exhaust condenser, and ejector. FIG. 2 illustrates an example direct-type ORC TAA 100 with a compressed air cooler, exhaust condenser, and circulation pump. FIG. 3 illustrates an example indirect-type ORC TAA 200 with a flooded evaporator. FIG. 4 illustrates an example indirect-type ORC TAA 300, and FIG. 5 illustrates an example four port TAA 400 for a pumped two-phase fluid cooling sub-circuit.

With initial reference to FIG. 1, TAA 10 for a WHRS 11 is illustrated in accordance with the principles of the present disclosure. In the example embodiment, TAA 10 generally includes an accumulator vessel or housing 12, an exhaust condenser heat exchanger 14, a compressed air cooler (CAC) heat exchanger 16, a filter/desiccant 18, an expander generator 20, an expander bypass valve 22, one or more sensors 24, and an ejector 26.

In the example embodiment, the accumulator housing 12 is hermetically sealed and includes an inlet port 30, an outlet port 32, and a separator plate 34. The inlet port 30 is configured to receive a two-phase thermal fluid or coolant (e.g., refrigerant, water/ethylene glycol, etc.) from a component 36 heated or cooled by the WHRS such as, for example, a two-phase fluid cooled fuel cell stack or internal combustion engine. The outlet port 32 is configured to return the two-phase coolant to the WHRS component 36 after further cooling, for example, in an external condenser 66 (e.g., a vehicle radiator). The separator plate 34 is configured to divide an interior of the accumulator housing 12 into a higher pressure first or lower chamber 38 and a relatively lower pressure second or upper chamber 40.

In the illustrated example, the exhaust condenser heat exchanger 14 is disposed in the housing lower chamber 38 and may or may not be submerged in a variable reservoir of liquid phase coolant 42 therein. The exhaust condenser heat exchanger 14 includes an inlet port 44 and an outlet port 46. The inlet port 44 is configured to receive a flow of two-phase coolant from the WHRS (e.g., from component 36), and the outlet port 46 is configured to return cooled coolant to the WHRS 11.

In the example embodiment, the CAC heat exchanger 16 is disposed in the housing lower chamber 38 between the exhaust condenser heat exchanger 14 and the filter/desiccant 18. The CAC heat exchanger 16 may or may not be submerged in the variable level liquid phase coolant 42 contained within the housing lower chamber 38. The CAC heat exchanger 16 includes an inlet port 48 and an outlet port 50. The inlet port 48 is configured to receive a flow of compressed air from an air compressor 52, and the outlet port 50 is configured to provide a flow of cooled, compressed air to the WHRS (e.g., component 36). The filter/desiccant 18 is configured to dry and filter contaminants in the vapor phase coolant rising toward the housing upper chamber 40.

In the example implementation, the expander generator 20 generally includes an expander 60 operably coupled to a motor generator 62. The expander 60 (e.g., a scroll, turbine, etc.) is disposed in the separator plate 34 between the high pressure lower chamber 38 and the low pressure upper chamber 40. High pressure vapor phase coolant passes into and rotates the expander 60 to thereby generate power with the motor generator 62. The resulting expanded and cooled lower pressure coolant then passes into the housing upper chamber 40.

The expander bypass valve 22 is also disposed in the separator plate 34 between the housing lower chamber 38 and the housing upper chamber 40. The expander bypass valve 22 includes a solenoid coil 64 and is configured for continuous variable pressure control (e.g., electrically or electronically controlled) within the accumulator housing 12. The expander bypass valve 22 is arranged in parallel with the expander 60 and is configured to regulate pressure in the upper chamber 40, which is fluidly connected to external condenser 66 via outlet port 32. In one example, when the vehicle achieves a high operating power, propulsion system performance may be limited by condenser 66, so the expander bypass valve 22 is opened to allow the vapor phase coolant to bypass the expander 60.

In the example embodiment, the one or more sensors 24 may include a temperature sensor and/or a pressure sensor configured to measure differential pressure across the expander 60. The sensor(s) 24 may be in signal communication with a controller (not shown) for control/diagnostics of the expander generator 20 and the expander bypass valve 22. The ejector 26 is disposed in the upper chamber 40 proximate the outlet port 32 and is fluidly coupled to the lower chamber 38 via a conduit 68. As shown in the illustrated example, outlet port 32 includes a venturi 70 configured to induce fluid flow in the outlet port 32 by rapidly expanding liquid coolant 42 supplied to the ejector 26 via conduit 68. In this way, the ejector 26 is configured to create a jet of expanding fluid, which creates a vacuum and draws vapor out of the upper chamber 40 and through outlet port 32.

In one example operation of TAA 10, two-phase coolant is received through housing inlet port 30 into the housing lower chamber 38. Vapor coolant rises and passes through the filter/desiccant 18 to the expander generator 20 and/or the expander bypass valve 22. The liquid coolant 42 is collected in the lower chamber 38 and may undergo indirect thermal heat exchange to cool fluid passing through the exhaust condenser heat exchanger 14 and the CAC heat exchanger 16, depending on the reservoir liquid level. During the heat exchange, some of the liquid coolant boils into vapor and similarly rises and passes through the filter/desiccant 18.

The high pressure vapor coolant then passes through the expander generator 20 to generate electricity via the motor generator 62 and/or passes through the expander bypass valve 22 into the upper chamber 40. High pressure liquid coolant 42 is drawn through conduit 68 to ejector 26 and sprayed into venturi 70 to draw vapor coolant in upper chamber 40 into the outlet port 32. Two-phase coolant is supplied from outlet port 32 to the external condenser 66, where the coolant is cooled and condensed and subsequently returned to the WHRS component 36 for cooling thereof. The resulting heated coolant is then returned to the inlet port 30 of TAA 10 to repeat the cycle. The heated compressed air from air compressor 52 is directed through CAC heat exchanger 16 for cooling thereof, and may be subsequently supplied to the WHRS component 36 for further cooling thereof. The resulting heated air may be directed to the exhaust condenser heat exchanger 14 for cooling thereof, and subsequently utilized in the WHRS.

With reference now to FIG. 2, the TAA 100 will be described in more detail. TAA 100 is similar to TAA 10 except it includes a circulation pump 80 instead of ejector 26, a liquid outlet port 82, a second inlet port 84, and a second expander generator 86. It will be appreciated that TAA 10 may also include the second expander generator 86. Like reference numerals indicate like parts and their description may be found above in the discussion of TAA 10.

In the example embodiment, the circulation pump 80 is disposed in the accumulator housing lower chamber 38. The circulation pump 80 is configured to pump liquid coolant 42 through the liquid outlet port 82 formed in the housing 12. The liquid coolant supplied through outlet port 82 may be further utilized in the WHRS, for example, via supply to the WHRS component 36 for further cooling thereof. Two-phase coolant may be received through second inlet port 84 from a portion of the WHRS such as, for example, the external condenser 66. Any vapor portion of the coolant received through second inlet port 84 (whether already vapor or subsequently vaporized against heat exchangers 14, 16) rises through the filter/desiccant 18 toward the expander generators 20, 86 and expander bypass valve 22.

In the example implementation, the second expander generator 86 is similar to expander generator 20 and is in parallel therewith in the separator plate 34. However, in one example, the expander generator 86 is a lower power level expander than the expander generator 20. In this way, the expander generator 86 may be utilized to generate electricity during lower power level operations of the vehicle, while the expander generator 20 may be utilized to generate electricity during higher power level operations of the vehicle (e.g., peak power level). It will be appreciated that expander generators 20, 86 may be operated alternatively or simultaneously depending on power generation requirements, or TAA 100 may include only one of expander generator 20, 86. Operation of the TAA 100 is similar to that of TAA 10 except for the differences discussed above.

With reference now to FIG. 3, the TAA 200 will be described in more detail. In the example embodiment, TAA 200 generally includes an accumulator vessel or housing 212, an evaporator 214, an expander generator 220, an expander bypass valve 222, one or more sensors 224, a circulation pump 226, and a lift pump 228.

In the example embodiment, the accumulator housing 212 is hermetically sealed and includes an inlet port 230, an outlet port 232, and a separator plate 234. The inlet port 230 is configured to receive a flow of two-phase coolant (e.g., refrigerant, water/ethylene glycol, etc.) from a component 236 in the WHRS such as, for example, an external condenser. The outlet port 232 is configured to return the two-phase coolant (e.g., saturated vapor) to the WHRS component 236 for cooling. The separator plate 234 is configured to divide an interior of the accumulator housing 212 into a higher pressure first or lower chamber 238 and a relatively lower pressure second or upper chamber 240. Lower chamber 238 acts as a reservoir for liquid phase coolant 242.

In the illustrated example, the evaporator 214 is a generally annular, plate-type heat exchanger that may be coupled to and extend through the separator plate 234. The evaporator 214 includes a first inlet port 244, a first outlet port 246, a second inlet port 248, and a plurality of outlet ports 250. The first inlet port 244 is configured to receive high temperature two-phase coolant from the WHRS (e.g., from a fuel cell stack, not shown), which is then distributed through various conduits (not shown) around the annular shape for indirect heat exchange with the liquid phase coolant 242 supplied to second inlet port 248 by circulation pump 226. The resulting cooled coolant is then supplied to the WHRS component via the first outlet port 246. However, it will be appreciated that evaporator 214 may have any suitable construction that enables TAA 200 to function as described herein.

In the example embodiment, the liquid coolant 242 supplied to evaporator 214 via second inlet port 248 is subsequently distributed through a plurality of conduits (not shown) extending around the annular heat exchanger for indirect heat exchange with the high temperature coolant entering first inlet port 244. At least a portion of the liquid coolant 242 is vaporized and leaves the evaporator 214 via the plurality of second outlet ports 250 (e.g., perforations in the conduits) into the lower chamber 238. However, as noted above, evaporator 214 may have various configurations.

In the example implementation, the expander generator 220 generally includes an expander 260 operably coupled to a motor generator 262. The expander 260 (e.g., a turbine) is disposed in the separator plate 234 between the high pressure lower chamber 238 and the low pressure upper chamber 240. High pressure vapor phase coolant passes into and rotates the expander 260 to thereby generate power with the motor generator 262. The resulting expanded and cooled lower pressure coolant then passes into the housing upper chamber 240. The expander bypass valve 222 and sensors 224 are similar to expander bypass valve 22 and sensors 24, the function and operation of which has already been described herein in detail. In the example embodiment, the circulation pump 226 is configured to supply liquid coolant 242 to the evaporator second inlet port 248, and the lift pump 228 is configured to pull liquid from the component 236 and increase pressure in the lower chamber 238.

In one example operation of TAA 200, two-phase coolant is received through housing inlet port 230 into the housing lower chamber 238. Vapor coolant rises toward the expander generator 220 and/or the expander bypass valve 222. The liquid coolant 242 is pumped by circulation pump 226 to the evaporator second inlet port 248, and at least a portion is vaporized via heat exchange with the high temperature coolant entering evaporator first inlet port 244. The high pressure vapor coolant in lower chamber 238 then passes through expander generator 220 to generate electricity via the motor generator 262 and/or passes through the expander bypass valve 222 into the upper chamber 240. The coolant (e.g., saturated vapor) is then supplied via housing outlet port 232 to the external condenser 266, where the coolant is cooled and condensed and subsequently returned to the WHRS component 236 for cooling thereof. The resulting heated coolant is then returned to the inlet port 230 of TAA 200 to repeat the cycle.

With reference now to FIG. 4, the TAA 300 will be described in more detail. The TAA 300 is similar to the TAA 200 except the two-phase thermal working fluid is sealed within the housing (i.e., an enclosed refrigerant circuit without external refrigerant connections), the external condenser is now contained within the housing of TAA 300, and an expander bypass valve is not required. In the example embodiment, TAA 300 generally includes an accumulator vessel or housing 312, an evaporator 314, a condenser 316, an expander generator 320, and a circulation pump 326.

In the example embodiment, the accumulator housing 312 is hermetically sealed and includes a first separator plate 334 and a second separator plate 335. The first separator plate 334 is configured to divide an interior of the accumulator housing 312 into a first or lower chamber 338 and a second or upper chamber 340. Lower chamber 338 acts as a reservoir for liquid phase coolant 342. The second separator plate 335 may be utilized to support various internal components.

In the illustrated example, the evaporator 314 is a generally annular, plate or fin type heat exchanger and is coupled to one side of the first separator plate 334. The evaporator 314 includes a first inlet port 344, a first outlet port 346, a second inlet port 348, and a plurality of outlet ports 350. The first inlet port 344 is configured to receive heated two-phase coolant from the WHRS (e.g., from component 336), which is then distributed through various conduits (not shown) around the annular shape for indirect heat exchange with liquid phase coolant 342 supplied to second inlet port 348 by circulation pump 326. The resulting cooled coolant is then supplied to the WHRS component 336 via the first outlet port 346. However, it will be appreciated that evaporator 314 may have any suitable construction that enables TAA 300 to function as described herein.

In the example embodiment, the liquid coolant 342 supplied to evaporator 314 via second inlet port 348 is subsequently distributed through a plurality of conduits (not shown) extending around the annular heat exchanger for indirect heat exchange with the high temperature coolant entering the first inlet port 344. At least a portion of the liquid coolant 342 is vaporized and leaves the evaporator 314 via the plurality of second outlet ports 350 (e.g., perforations in the conduits) into the lower chamber 338. However, as noted above, evaporator 314 may have various configurations.

In the example implementation, the condenser 316 is a generally annular, plate or fin type heat exchanger disposed between the first and second separator plates 334, 335. In this way, the annular condenser 316 further divides the upper chamber 340 into an interior chamber 352 and an exterior chamber 354. The condenser 316 includes an inlet port 356 and an outlet port 358. The inlet port 356 is configured to receive low temperature two-phase coolant from the WHRS (e.g., from component 336), which is then distributed through various conduits (not shown) around the annular shape for indirect heat exchange with vapor coolant in the upper chamber 340. The resulting heated coolant is then supplied to the WHRS (e.g., component 336) via the outlet port 358. However, it will be appreciated that condenser 316 may have any suitable construction that enables TAA 300 to function as described herein.

In the example embodiment, the expander generator 320 generally includes an expander 360 operably coupled to a motor generator 362. The expander 360 (e.g., a turbine) is disposed in the separator plate 334 between the higher pressure lower chamber 338 and the lower pressure upper chamber 340. Higher pressure vapor phase coolant passes into and rotates the expander 360 to thereby generate power with the motor generator 362. The resulting expanded and cooled lower pressure coolant then passes into the interior upper chamber 352 where the vapor phase coolant flows radially outward toward the exterior chamber 354. As the vapor contacts the condenser 316, it condenses from heat exchange with the low temperature coolant flowing in the condenser 316 from inlet port 356. The resulting condensed coolant then falls (e.g., by gravity) onto first separator plate 334, passes through one or more apertures 364 (e.g., perforations, one-way valves, etc.) formed therein, and subsequently returns to the lower chamber 338.

In one example operation of TAA 300, two-phase coolant is sealed within the accumulator housing 312. The liquid coolant 342 is pumped by circulation pump 326 to the evaporator second inlet port 348, and at least a portion is vaporized via heat exchange with the coolant entering the evaporator first inlet port 344. The high pressure vapor coolant in lower chamber 338 then passes through expander generator 320 to generate electricity via the motor generator 362, and into the upper interior chamber 352. As the vapor flows outward to the exterior chamber 354, at least a portion of the vapor coolant condenses against the condenser 316 in heat exchange with the coolant entering the condenser inlet port 356. Condensed coolant then passes through apertures 364 and returns to the lower chamber 338 to repeat the cycle. High temperature coolant cooled in the evaporator 314 is returned to the WHRS to repeat the cycle, and low temperature coolant heated in the condenser 316 is returned to the WHRS to repeat the cycle.

With reference now to FIG. 5, the TAA 400 will be described in more detail. TAA 400 is configured for use in a WHRS to capture waste heat from a heat generating device (e.g., HV battery or electronics) and subsequently utilize the heat energy for use by another component (e.g., a heat pump). In the example embodiment, TAA 400 generally includes an accumulator vessel or housing 412, a fixed or variable pressure control valve 422, one or more sensors 424, and a circulation pump 426.

In the example implementation, accumulator housing 412 is hermetically sealed and includes a first inlet port 430, a first outlet port 432, a separator plate 434, a second inlet port 448, and a second outlet port 450. The first inlet port 430 is configured to receive a two-phase coolant (e.g., refrigerant, water/ethylene glycol, etc.) from a component 436 in the WHRS such as, for example a heat pump condenser. The first outlet port 432 is configured to supply liquid coolant 442 to a heat generating device 437 such as, for example, HV batteries or electronics. The separator plate 434 is configured to divide an interior of the accumulator housing 412 into a higher pressure first or lower chamber 438 and a relatively lower pressure second or upper chamber 440. The second inlet port 448 is configured to receive the two-phase coolant from heat generating device 437 after being utilized for cooling thereof. Liquid coolant returns to reservoir of liquid coolant 442, and vapor coolant rises toward the pressure control valve 422.

In the example embodiment, the pressure control valve 422 is disposed in the separator plate 434 between the housing lower chamber 438 and the housing upper chamber 440. The pressure control valve 422 may be a fixed valve configured to open at a predetermined pressure, or a variable valve configured for continuous variable pressure control (e.g., electrically or electronically controlled). The one or more sensors 424 may include a temperature sensor and/or a pressure sensor configured to measure differential pressure across the valve 422. The sensor(s) 424 may be in signal communication with a controller (not shown) for control/diagnostics of the pressure control valve 422.

In one example operation of TAA 400, two-phase coolant is received through housing first inlet port 430 into the housing lower chamber 438. Vapor coolant rises toward the pressure control valve 422, and the liquid coolant 442 is pumped by circulation pump 426 to the housing first outlet port 432. The liquid coolant 442 is then heated by heat generating device 437. This heating at least partially vaporizes the liquid coolant, which is then returned to the housing lower chamber 438 via the second inlet port 448. Any liquid coolant returns by gravity to the reservoir of liquid coolant 442, and vapor coolant rises toward the pressure control valve 422. The vapor coolant passes through pressure control valve 422 into the housing upper chamber 440 and is subsequently directed through second outlet port 450. The vapor coolant is then sent to the WHRS for cooling, for example via heat sink component 436. The cooled coolant is at least partially condensed and returned to the housing lower chamber 438 via first inlet port 430 to repeat the cycle.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A thermal accumulator assembly (TAA) for a vehicle waste heat recovery system (WHRS) utilizing a two-phase coolant, the TAA comprising:

a hermetically sealed housing having a separator plate dividing an interior of the housing into a higher pressure first chamber and a lower pressure second chamber;

a pressure control valve disposed between the first and second chambers and configured to regulate pressure in the second chamber by regulating an amount of vapor coolant passing from the first chamber to the second chamber;

a first inlet port connected to the first chamber and configured to receive a first flow of coolant from the WHRS;

a first outlet port connected to the first chamber and configured to receive a second flow of liquid coolant from the first chamber and provide the second flow to a heat generating component in the WHRS;

a second inlet port connected to the first chamber and configured to receive a third flow of heated coolant from the heat generating component; and a second outlet port connected to the second chamber and configured to supply a fourth flow of vapor coolant to the WHRS.

2. The TAA of claim 1, further comprising at least one sensor disposed between the first and second chambers and configured to measure a pressure differential between the first and second chambers.

3. The TAA of claim 1, further comprising a circulation pump disposed in the first chamber and configured to provide the second flow of liquid coolant to the first outlet port.

4. The TAA of claim 1, wherein the pressure control valve is a continuous variable pressure control valve.

5. The TAA of claim 4, wherein the continuous variable pressure control valve is in signal communication with a controller.

6. The TAA of claim 4, wherein the continuous variable pressure control valve includes a solenoid.

7. The TAA of claim 1, wherein the pressure control valve is a fixed variable pressure control valve configured to open at a predetermined pressure.

8. A vehicle comprising:

a heat generating component;

a waste heat recovery system (WHRS) fluidly coupled to the heat generating component and comprising a two-phase coolant for cooling the heat generating component; and a thermal accumulator assembly (TAA) fluidly coupled to the WHRS and comprising:

a hermetically sealed housing having a separator plate dividing an interior of the housing into a higher pressure first chamber and a lower pressure second chamber;

a pressure control valve disposed between the first and second chambers and configured to regulate pressure in the second chamber by regulating an amount of vapor coolant passing from the first chamber to the second chamber;

a first inlet port connected to the first chamber and configured to receive a first flow of coolant from the WHRS;

a first outlet port connected to the first chamber and configured to receive a second flow of liquid coolant from the first chamber and provide the second flow to the heat generating component;

a second inlet port connected to the first chamber and configured to receive a third flow of heated coolant from the heat generating component; and a second outlet port connected to the second chamber and configured to supply a fourth flow of vapor coolant to the WHRS.

9. The vehicle of claim 8, wherein the vehicle includes a second component fluidly coupled to the WHRS.

10. The vehicle of claim 9, wherein the second outlet port is configured to supply the fourth flow of vapor coolant to the second component.

11. The vehicle of claim 10, wherein the first inlet is configured to receive the first flow of coolant from the second component.

12. The vehicle of claim 11, wherein the second component is a heat pump condenser.

13. The vehicle of claim 12, wherein the heat generating component is at least one of high voltage batteries or electronics.

14. The vehicle of claim 8, wherein the TAA further includes at least one sensor disposed between the first and second chambers and configured to measure a pressure differential between the first and second chambers.

15. The vehicle of claim 8, wherein the TAA further includes a circulation pump disposed in the first chamber and configured to provide the second flow of liquid coolant to the first outlet port.

16. The vehicle of claim 8, wherein the pressure control valve is a continuous variable pressure control valve.

17. The vehicle of claim 16, wherein the continuous variable pressure control valve is in signal communication with a controller.

18. The vehicle of claim 8, wherein the pressure control valve is a fixed variable pressure control valve configured to open at a predetermined pressure.

* * * * *